(12) United States Patent
Breault et al.

(10) Patent No.: US 7,435,502 B2
(45) Date of Patent: Oct. 14, 2008

(54) INTERNAL PEM FUEL CELL WATER MANAGEMENT

(75) Inventors: Richard D. Breault, North Kingstown, RI (US); Michael D. Harrington, Enfield, CT (US); Frederick Sribnik, Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 691 days.

(21) Appl. No.: 10/668,869

(22) Filed: Sep. 22, 2003

(65) Prior Publication Data

US 2005/0064261 A1  Mar. 24, 2005

(51) Int. Cl.
*H01M 2/00* (2006.01)
*H01M 2/02* (2006.01)
(52) U.S. Cl. .............................. 429/38; 429/34; 429/39
(58) Field of Classification Search ................. 429/39, 429/38; 439/34
See application file for complete search history.

(56) References Cited

U.S. PATENT DOCUMENTS

2002/0164513 A1* 11/2002 Asano et al. .................. 429/32
2003/0148164 A1* 8/2003 Koch et al. .................... 429/34
2003/0232234 A1* 12/2003 Cisar et al. .................... 429/38

OTHER PUBLICATIONS

U.S. Appl. No. 10/465,006, filed Jun. 19, 2003, Grasso et al.

* cited by examiner

*Primary Examiner*—Patrick Ryan
*Assistant Examiner*—Ben Lewis
(74) *Attorney, Agent, or Firm*—M. P. Williams (57) ABSTRACT

Water transfer means (86) transfers fuel cell product water from a cathode water transport plate (34) to an anode water transport plate (23) of the same or a different fuel cell, wholly within a fuel cell stack (50), (disposed within each fuel cell of a fuel cell stack (50)). The water transfer means may be a very high permeability proton exchange membrane (21a), a water transfer band (90) such as silicon carbide particles, a porous water transfer zone (107), with or without a flow restrictor (109), internal water manifolds (112, 113) which extend through an entire fuel cell stack, or internal manifolds (112a, 112b, 112c, 112d, 113a, 113b, 113c, 113d) which extend only through groups of cells between solid plates (71). As an example, 90% product water may be removed as vapor in oxidant exhaust, 30% may be transferred through the water transfer means (86) from cathode water transport plates to anode water transport plates, of which 20% may flow from the anode to the cathode, the net result of osmosis and proton drag, and 10% may exit the anode water transport plates as liquid water.

16 Claims, 9 Drawing Sheets

INTERNAL PEM FUEL CELL WATER MANAGEMENT

TECHNICAL FIELD

This invention relates to transferring water from the cathodes of PEM fuel cells to the anodes of PEM fuel cells, without external flow paths external to the fuel cell stack, either within a single cell or a small group of cells, without comingling water from other cells, or throughout an entire fuel cell stack.

BACKGROUND ART

Figure 1:
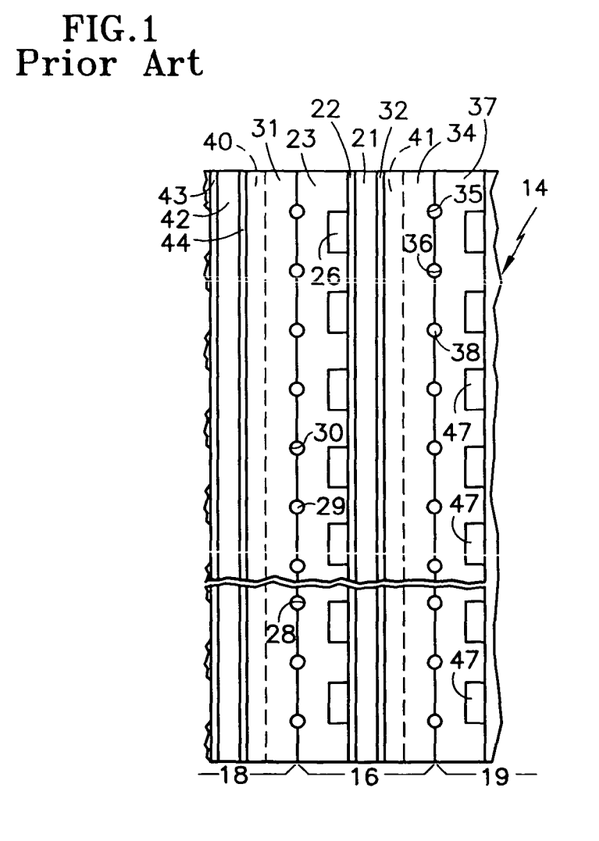
FIG. 1 is a stylized, simplified side elevation sectional view, with sectioning lines omitted for clarity, of a conventional fuel cell and portions of adjacent fuel cells.

In FIG. 1, a conventional fuel cell stack 14 has about 300 fuel cells; only a fuel cell 16 and portions of adjacent fuel cells 18, 19 are shown. The fuel cell 16 comprises a membrane electrode assembly (MEA) 21 which includes a proton exchange membrane together with cathode and anode catalysts. An anode support plate 22 is adjacent to a porous anode water transport plate 23, which includes fuel flow field passages 26 and grooves 28 which make up coolant water passageways 29 when matched with grooves 30 on an adjacent cathode water transport plate 31. Similarly, a cathode support plate 32 is adjacent to a porous cathode water transport plate 34 which has grooves 35 which will form water passages 38 when matched with grooves 36 of an additional anode water transport plate 37 of the next fuel cell 19. In many PEM fuel cells, the water passages will be in only one water transport plate, the contiguous water transport plate of the adjacent cell being flat.

The cathode water transport plate 31 of the cell 18 has oxidant reactant gas passages 40, and the cathode water transport plate 34 has oxidant reactant gas flow field passages 41. The fuel cell 18, only partially shown, includes a membrane electrode assembly 42, an anode support plate 43, and a cathode support plate 44, the remainder of this fuel cell being broken away for simplicity.

Figure 2:
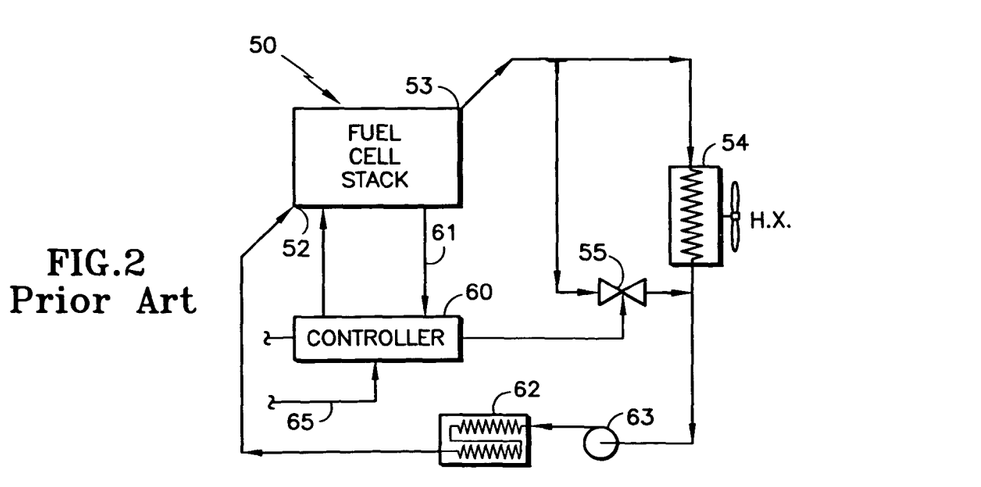
FIG. 2 is a simplified block diagram of a portion of a conventional fuel cell power plant.

In conventional PEM fuel cell power plants, the water management system includes the porous water transport plates 23, 31, 34, 37 which have reactant gas channels 26, 40, 41, 47 on one side and water channels 29, 38 on the other side. Referring to FIG. 2, a conventional fuel cell stack 50 may include about 300 cells similar to the cells 16, 18 and 19 in FIG. 1, and may have a water management system in which water enters the water inlet manifold 52, passes through the channels 29, 38 (FIG. 1), exits a water exit manifold 53, and traverses either through a heat exchanger 54 or a bypass valve 55. The bypass valve 55 can be selectively opened to a varying degree in response to a controller 60 which may receive temperature information over a line 61 from the stack 50. A water pump 63 will cause circulation of water through the stack and the heat exchanger. There may be an accumulator 62 in some systems.

This apparatus takes up space which is scarce, particularly in electric vehicles powered by a fuel cell. Furthermore, the parasitic power requirement of the electric pump detracts from the overall efficiency of the fuel cell process.

The conventional wisdom related to starting fuel cells, particularly for automotive applications, when they have been subjected to freezing temperatures, is to heat the fuel cell prior to starting it, which means a significant delay before the vehicle can be operated. A concomitant goal has been to reduce the amount of water which remains in the power plant, thus to reduce the amount of water which has to be thawed and heated prior to operating the fuel cell power plant. In commonly owned, copending U.S. patent application Ser. No. 10/465,006 filed Jun. 19, 2003, a PEM fuel cell stack has reactant gas flow fields and water flow fields in porous water transport plates, and separate coolant flow fields, the coolant being an antifreeze solution. Water management is accomplished without a mechanical water pump or other ancillary water moving means, by allowing reactant gas bubbles, which leak through porous plates into the water stream, to escape through a vent in communication with at least one water outlet manifold at the top of the stack. Therein, water movement may also be in response to convection since the water within the water channel has a lower effective density due to the presence of gas bubbles therein and due to being warmer than the water outside of the stack. However, that device still requires plumbing external to the fuel cell stack to circulate the water from a water exit manifold back to a water inlet manifold.

Some of the foregoing difficulties are overcome by using an antifreeze solution for controlling the temperature of the fuel cell stack, particularly removing heat during normal operation. However, this results in the use of cooler plates every 2-4 fuel cells, which prevents having the fuel cells separated by fine pore plates, such as the water transport plates 23, 31, 34, 37. While the fuel cell described with respect to FIG. 1 allows water generated at the cathode of one cell to flow across water transport plates to the anode of the adjacent cell, and is quite effective in preventing dehydration of the PEM, this mechanism cannot occur in cells which are adjacent to solid coolers or separated by solid separator plates (used to separate those cells which do not have a cooler there between).

Some so-called passive water management concepts, which have no circulating liquid water, do not properly humidify the fuel at the inlet of the cell stack, which results in locally drying out the water transport plate and the proton exchange membrane. Drying out of the water transport plate may lead to gas leakage from the anode flow fields into the anode water flow fields. Drying out of the PEM results in degradation of the PEM due to attack by peroxide formed within the cell. If the fuel is humidified close to 100% relative humidity, these dry out problems are prevented; but this requires greater system complexity, volume and weight, as well as additional parasitic power loss.

DISCLOSURE OF INVENTION

Objects of the invention include: PEM fuel cells which do not require a mechanical water pump, a water accumulator or any other water management apparatus external to the fuel cell stack; PEM fuel cells of greater efficiency; PEM fuel cells which are more suited to use in environments in which the temperature is liable to carry the fuel cell stack below the freezing temperature of water; PEM fuel cell stacks having reduced parasitic power; and improved PEM fuel cell stacks.

According to the present invention, a fraction of the product water in a PEM fuel cell is removed from the cathode, through the cathode water transport plate as liquid water, and is transferred internally of the fuel cell stack to the anode water transport plate, within the fuel cell itself.

According to the invention in one form, a water transport band is formed through the cathode and anode substrates and the proton exchange membrane (PEM) itself. In another form, the invention utilizes porous water transfer zones disposed along one or more edges of each fuel cell. In this form, water may be transferred by a pressure differential between the cathode and the anode, or water may be transferred by providing a capillary pressure gradient from the cathode water transport plate, to the cell edge water transfer zone, to the anode water transfer plate. The capillary pressure gradient is naturally established by surface tension forces operating within the water transport plates. The equilibrium pore size, within the anode water transport plates, decreases relative to the equilibrium pore size within the cathode water transport plates, as the water content of the anode water transport plates becomes deficient and the water content of the cathode water transport plates becomes excessive. This mechanism results in a larger capillary pressure within the anode water transport plates relative to the cathode water transport plate and results in water transfer from the cathode side of the cell to the anode side of the cell. In such case, there may be a restriction to limit the flow as desired.

In another form, the invention may utilize a high water permeability PEM which may include a microporous water-filled phase of more than 10% by volume, created within a hydrated nanoporous ionomer phase, of between 50 volume % and 70 volume %, in a PEM having between about 20 volume % and about 40 volume % of a structural insulating phase, which may include one micron diameter silicone carbide whiskers having an average length of between 5 microns and 10 microns. The hydrated nanoporous ionomer phase may consist of perflourosulfonic acid ionomer, to achieve a high water permeability PEM which is on the order of between 10 microns and 25 microns thick.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 3:
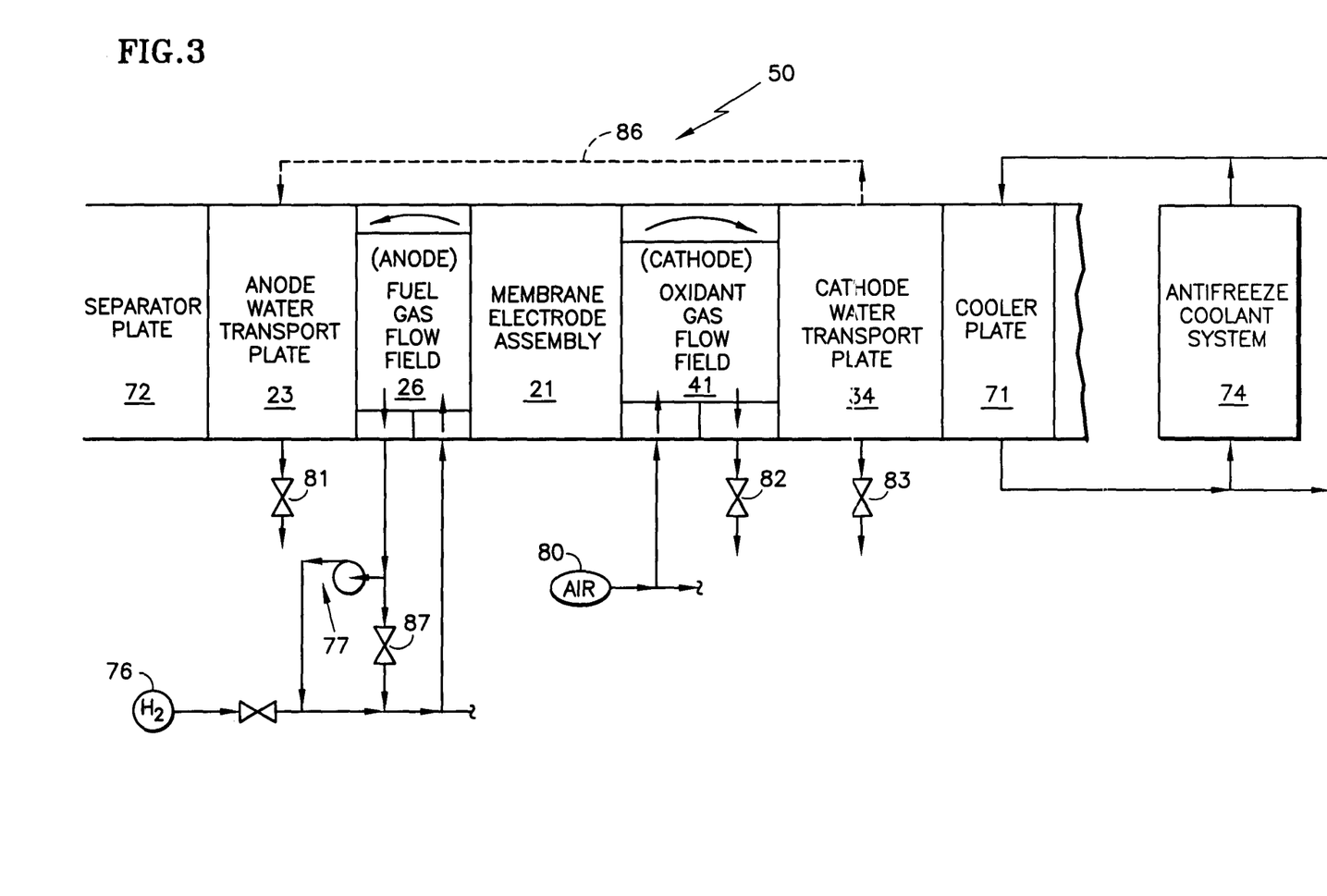
FIG. 3 is a simplified concept diagram of one form of a fuel cell incorporating the present invention.

Referring to FIG. 3, the concept of the present invention is illustrated schematically, in a fuel cell stack 50 having cooler plates 71 separating the fuel cells into groups of 2-4 fuel cells per group, and with separator plates 72 separating fuel cells which are not themselves separated by the cooler plates. Antifreeze coolant is provided by an antifreeze coolant system 74 to all of the cooler plates 71 of the stack 50.

A fuel such as hydrogen is provided to the anode fuel gas flow field from a source 76 and may include a fuel recycle loop 77. An oxidant, such as oxygen or air 80, may be provided to the cathode oxidant gas flow field 41. Valves 81, 83 may be provided so as to drain water from the water transport plates 23, 34. Valves 82, 87 may be provided to control the reactant pressures in the fuel gas flow field 26 and the oxidant gas flow field 41.

The concept of the invention is providing water transfer capability 86 for water to flow internally of the fuel cell stack, from the cathode water transport plate 34 to the anode water transport plate 23. In its broadest sense, the invention includes providing the water transfer capability 86 in a variety of ways, within a single cell, within a small group of cells between cooler plates, or within an entire stack of fuel cells, the details of which are not limiting of the invention.

In the anode, water is evaporated into the fuel gas, and water molecules are transported through the membrane electrode assembly 21 by proton drag, to the cathode. In order to avoid dryout, this water must be replaced, and it is typically replaced with water through the external water management system known to the art.

In the cathode, excess product water tends to accumulate if it is not removed by the cathode water transport plate; excess water at the cathode blocks the passage of oxidant to the catalyst, starving the fuel cell. In a typical case, most of the water is evaporated into the oxidant gas flow, and leaves the cell through the oxidant gas exhaust; but some of the water is removed through the water transport plate and taken out externally, where only some of it is returned so as to ensure not only that the anode does not dry out, but that the membrane electrode assembly on the cathode side, near the oxidant gas inlet, is also suitably humidified.

In accordance with the invention, removal of sufficient water from the cathode is accomplished by proper operating parameters as well as by transferring water directly to the anode through the water transfer capability 86, to the anode water transport plate. As an example of water transfer, about 90% of the product water may be removed as vapor from the cathode oxidant gas flow field 41, through its exhaust; about 30% of the product water can be removed from the cathode water transport plate 34 by being transferred over the water transfer capability 86 to the anode water transport plate 23. Of this, about 10% of the water will leave the cell through the anode water exhaust, such as the valve 87. Approximately 20% of the product water is transferred across the MEA 21 from the anode to the cathode. This represents the net water transfer as a consequence of proton drag and osmosis. The foregoing percentages are simply illustrative, and are not those which will actually result when the invention is implemented in any particular manner.

Figure 4:
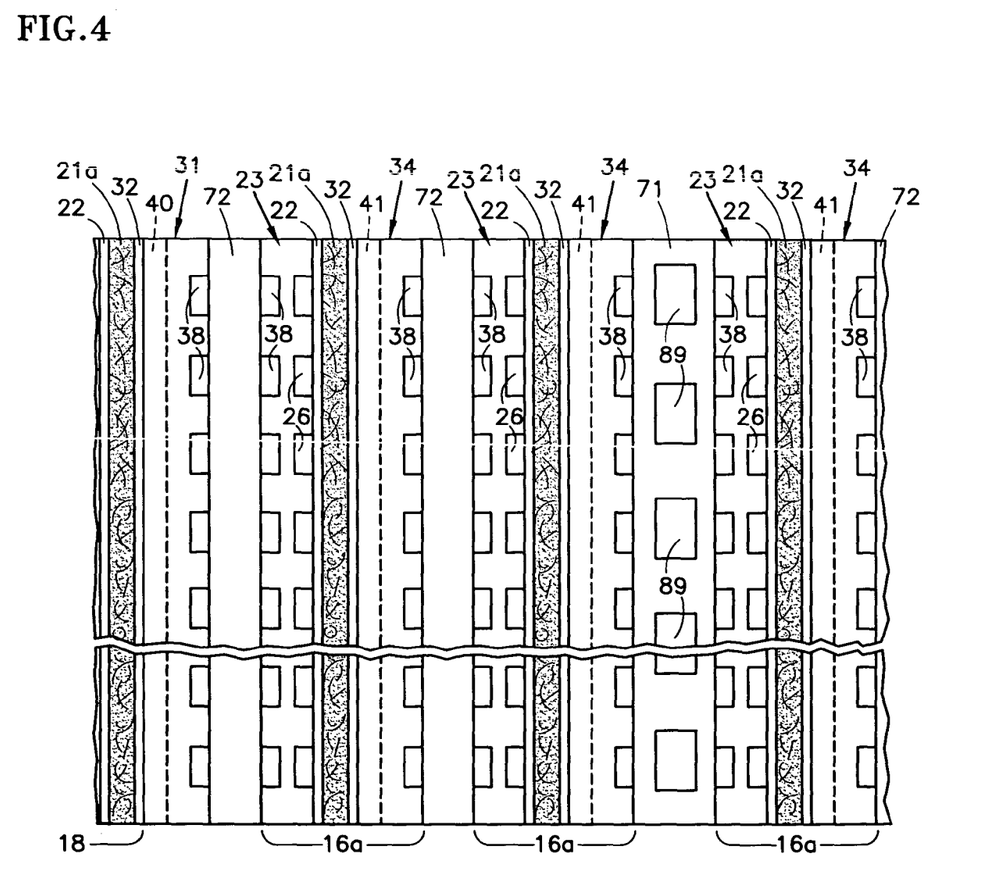
FIG. 4 is a stylized, simplified side elevation sectional view, with sectioning lines omitted for clarity, of a fuel cell having a proton exchange membrane including submicron open pores within hydrated nano porous ionomer which facilities conduction of water from the cathode water transport plate to the anode water transport plate, internally, in accordance with the present invention.

Referring to FIG. 4, the concept of the present invention, in one form, includes the fact that each fuel cell 16a is separated from a fuel cell adjacent thereto by means of either a conductive, water and gas impervious separator plate 72, or by a conductive, water and gas impervious cooler plate 71 which has antifreeze coolant water channels 89 therein.

In accordance with one embodiment of the invention, the membrane electrode assembly 21a in each of the fuel cells 16a is a high water permeability proton exchange membrane, which may be of the type illustrated in U.S. patent application Ser. No. 10/274,747, filed Oct. 21, 2002. However, the high water permeability PEM in the foregoing application is utilized in a system including an external water management system, through which product water of the fuel cells are conducted and disposed of. Since the present invention does away with any external water management plumbing (except drains to remove water at shutdown) the amount of the micro porous water-filled phase should be increased above 10 volume %, such as to between 15 volume % and 25 volume %. This is readily achieved in a manner that is described in the aforementioned application.

Figure 5:
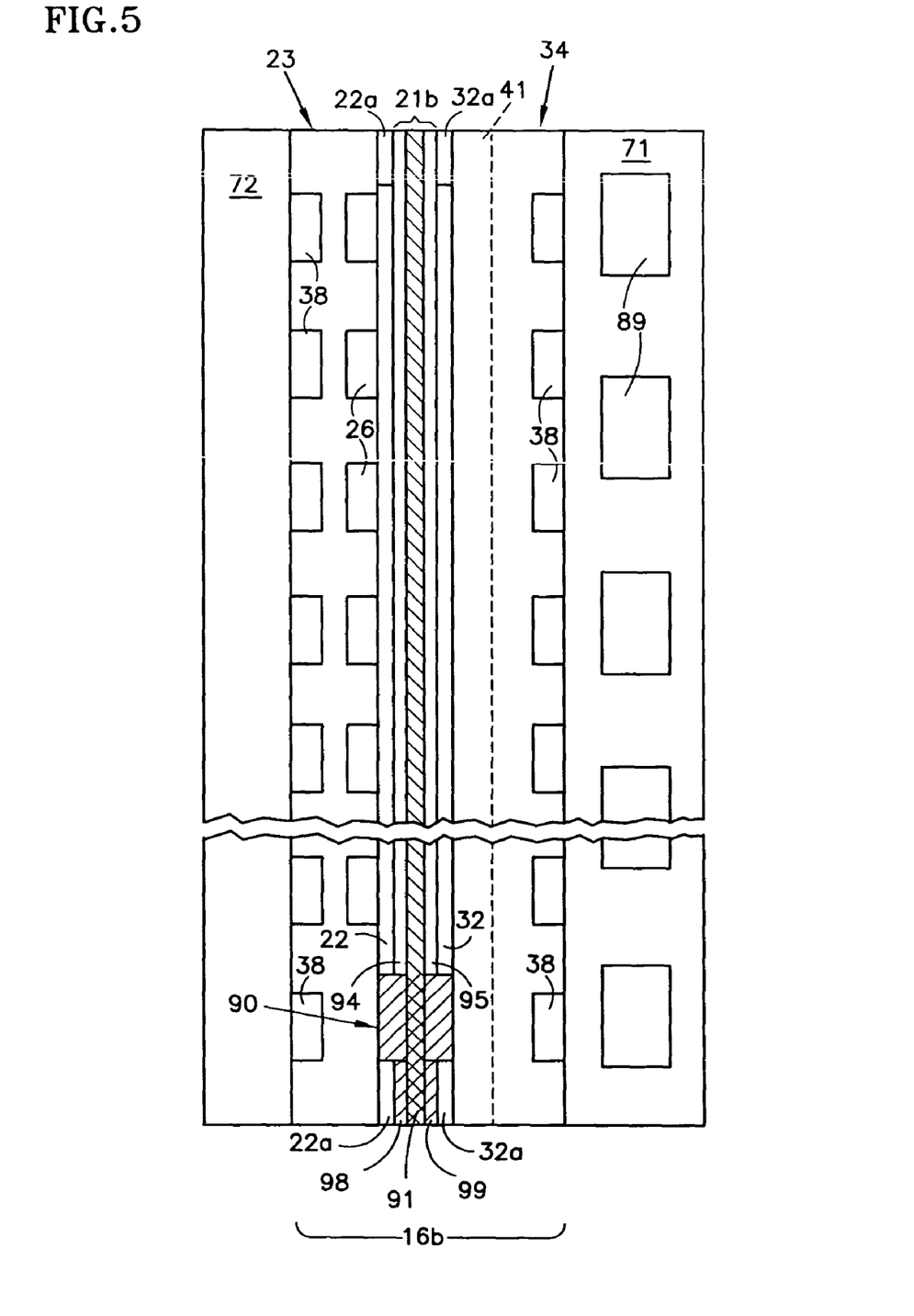
FIG. 5 is a stylized, simplified side elevation sectional view, with sectioning lines omitted for clarity, of a fuel cell having a water transfer band between the cathode water transport plate and the anode water transport plate, in accordance with the present invention.

A second embodiment of the invention is illustrated in FIG. 5. Therein, a water transfer band 90 is provided near one edge of the fuel cell 16b. The water transfer band 90 is formed by foreshortening the anode catalyst 94, the cathode catalyst 95 and the proton exchange membrane 91. The anode support plate 22 and cathode support plate 32 are impregnated, in the area of the water transport band 90 (double hatching), with a particle that is wettable, non-conductive, has a particle size of 5 microns or less, and is compatible with the cell environment. For instance, silicone carbide is one suitable material. Note that the thickness of the membrane 91 and catalysts 94, 95 are greatly exaggerated in FIG. 5. The particulate material may also be deposited, such as by screen printing (single hatching), onto the surfaces of the support plates 22, 32 to a thickness sufficient to maintain a uniform cell thickness between the anode water transport plate 23 and the cathode water transport plate 34. Conventional support plate seals 22a, 32a may be provided at the respective edges of the anode support plate 22 and the cathode support plate 32.

This embodiment of the invention is particularly well suited to fuel cell stacks which have two-pass air flow and two-pass fuel flow paths, with the fuel inlet and air exit located at the coolant inlet corner. Such a configuration results in a large quantity of water being condensed from the air stream, just across the membrane from the location where the fuel stream is entering and needs to be humidified. Thus, positioning a water transport band 90 in this corner of the cells is most advantageous. FIG. 5 shows the water transfer band to be located adjacent to the edge of a cell. The water transfer band may be located along one edge, along a portion of one edge, along two edges, along portions of two edges or in a central region of the cell.

Figure 6:
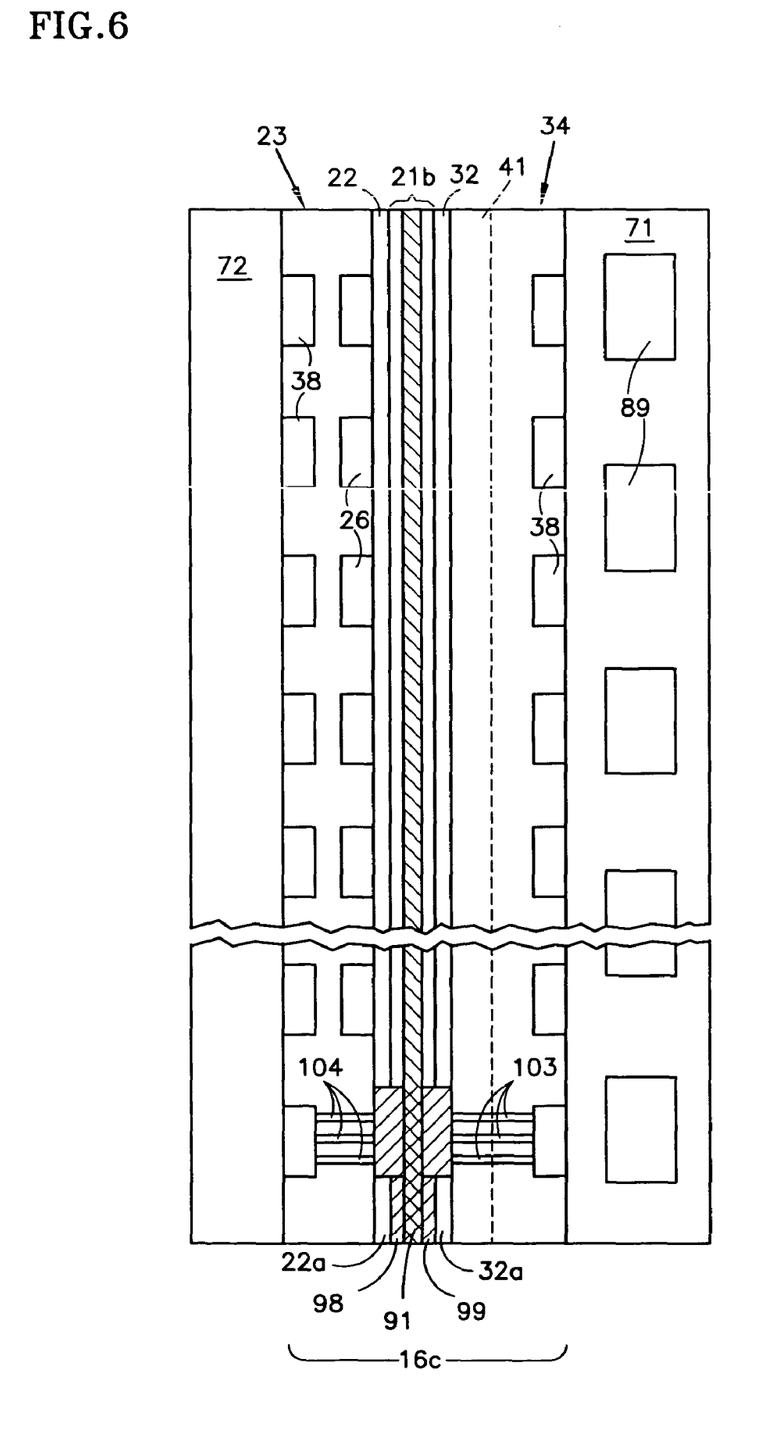
FIG. 6 is a modification of FIG. 5, with water transfer holes.

Should there be insufficient water flow volume from the water passage 38 in the cathode water transport plate 34, through the bulk of the cathode water transport plate 34 to the water transfer band 90, and from the water transfer band 90 through the bulk of the anode water transport plate 23 to the anode water passages 38, then the configuration of FIG. 6, with holes 103, 104 may be employed.

Figure 7:
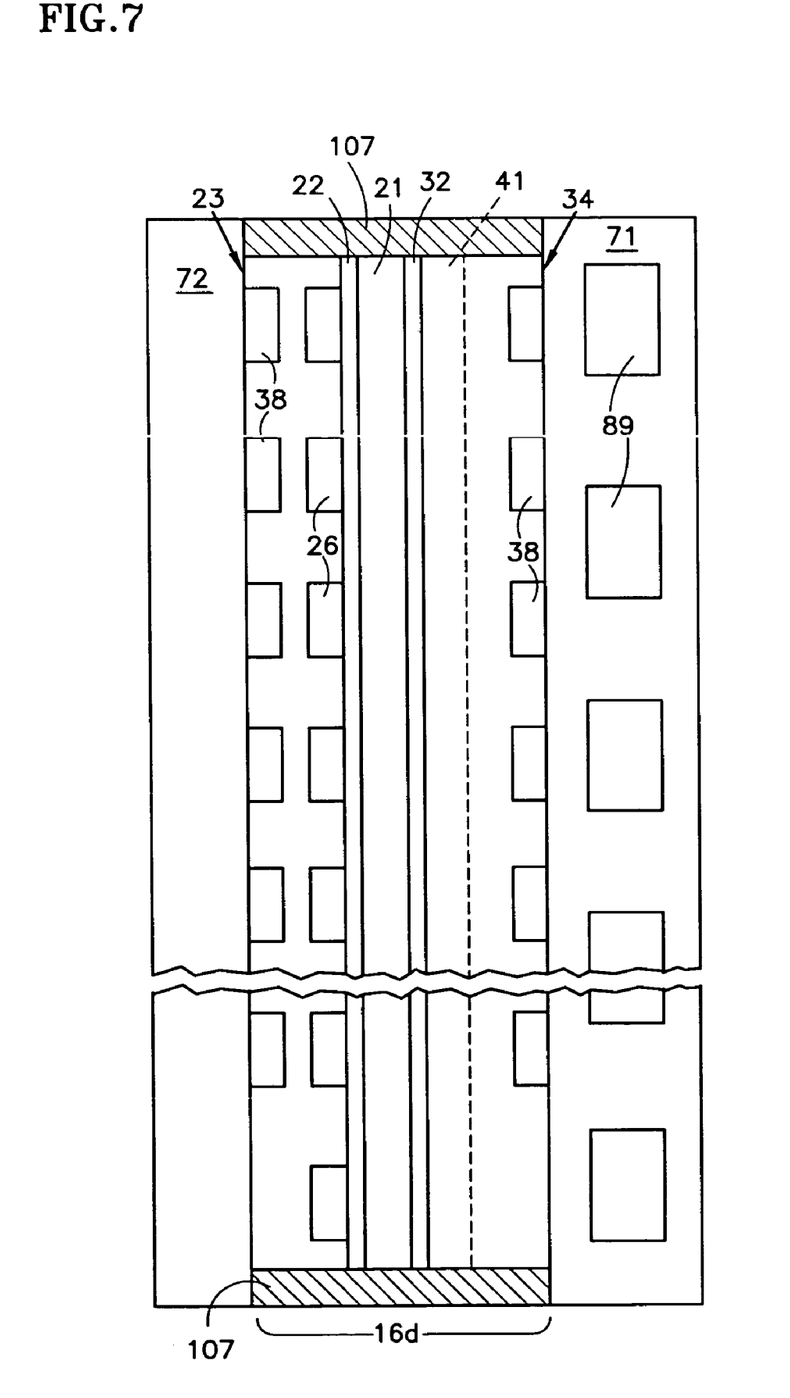
FIG. 7 is a stylized, simplified side elevation sectional view, with sectioning lines omitted for clarity, of a fuel cell having porous water transfer plates adjacent edges thereof in accordance with the present invention.
Figure 8:
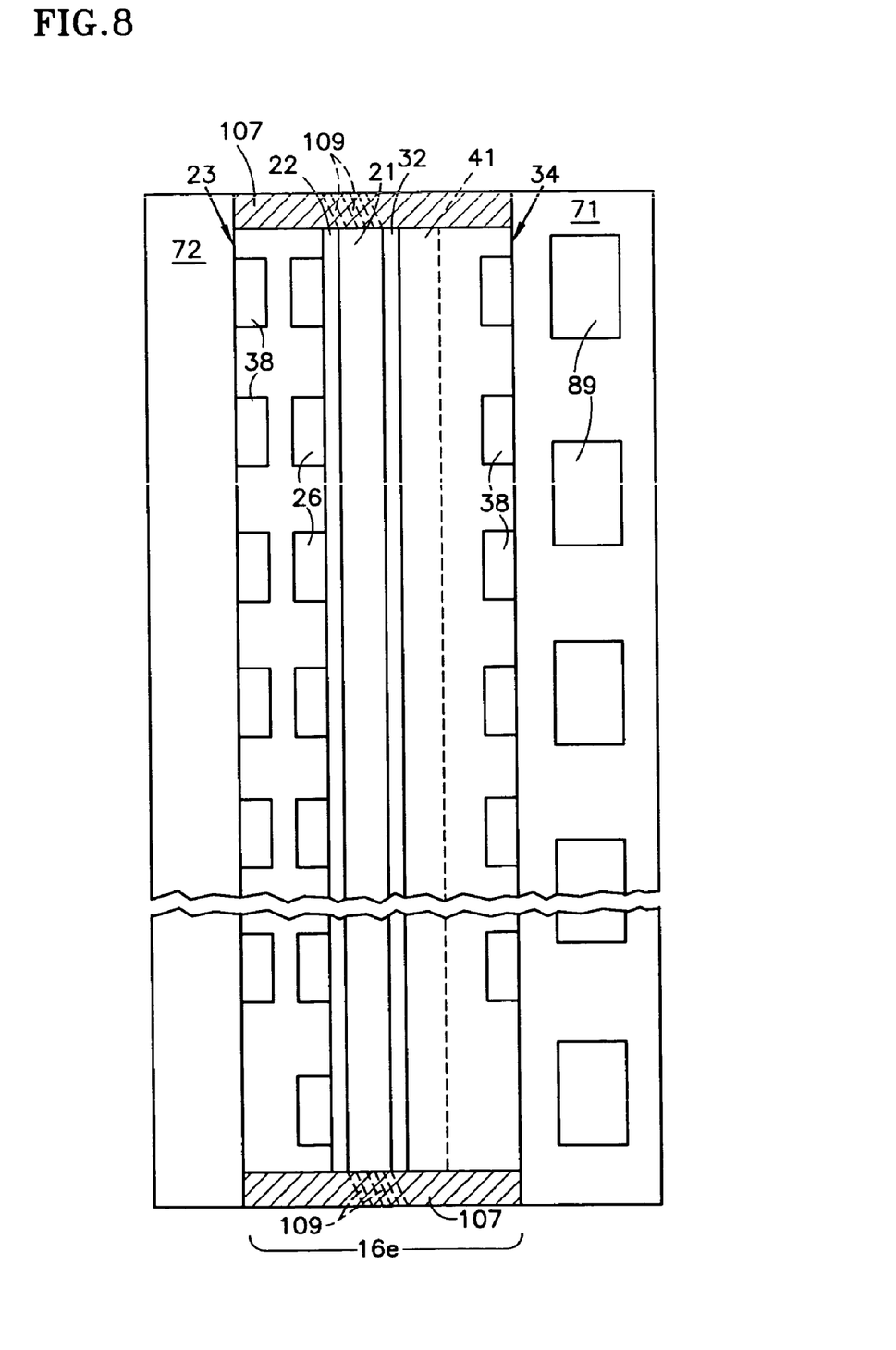
FIG. 8 is a modification of FIG. 7 which includes a flow restrictor, in accordance with the invention.

In FIG. 7, porous water transfer zones 107 may be provided at one or more edges of a fuel cell 16d so as to conduct water from the cathode water transport plate 34 to the anode water transport plate 23. Should there be a need to pressurize the oxidant fuel reactant gas to a pressure 7 to 14 kPa (1 or 2 psi) above the pressure of the fuel reactant gas, a flow restrictor 109, FIG. 8, may be employed within the water transfer zones 107 of the cell 16e. The flow restrictor may comprise a band along the zones 107, where the porosity is reduced, in which case the size of the pores must remain the same or smaller as those in the remainder of the water transfer zones 107 to facilitate wicking and to provide bubble-pressure blockage of reactant gases from escaping from the cell 16e. Or, the flow restrictor 109 may comprise a band along the zones having reduced pore size.

The embodiments of the invention hereinbefore all relate to conducting water from the cathode to the anode of a single fuel cell. The invention further encompasses that many of the fuel cells may have their anode flow fields contiguous with the cathode flow fields of the fuel cell adjacent thereto, except for those cells which are either contiguous with a solid separator plate or contiguous with a solid cooler plate.

Figure 9:
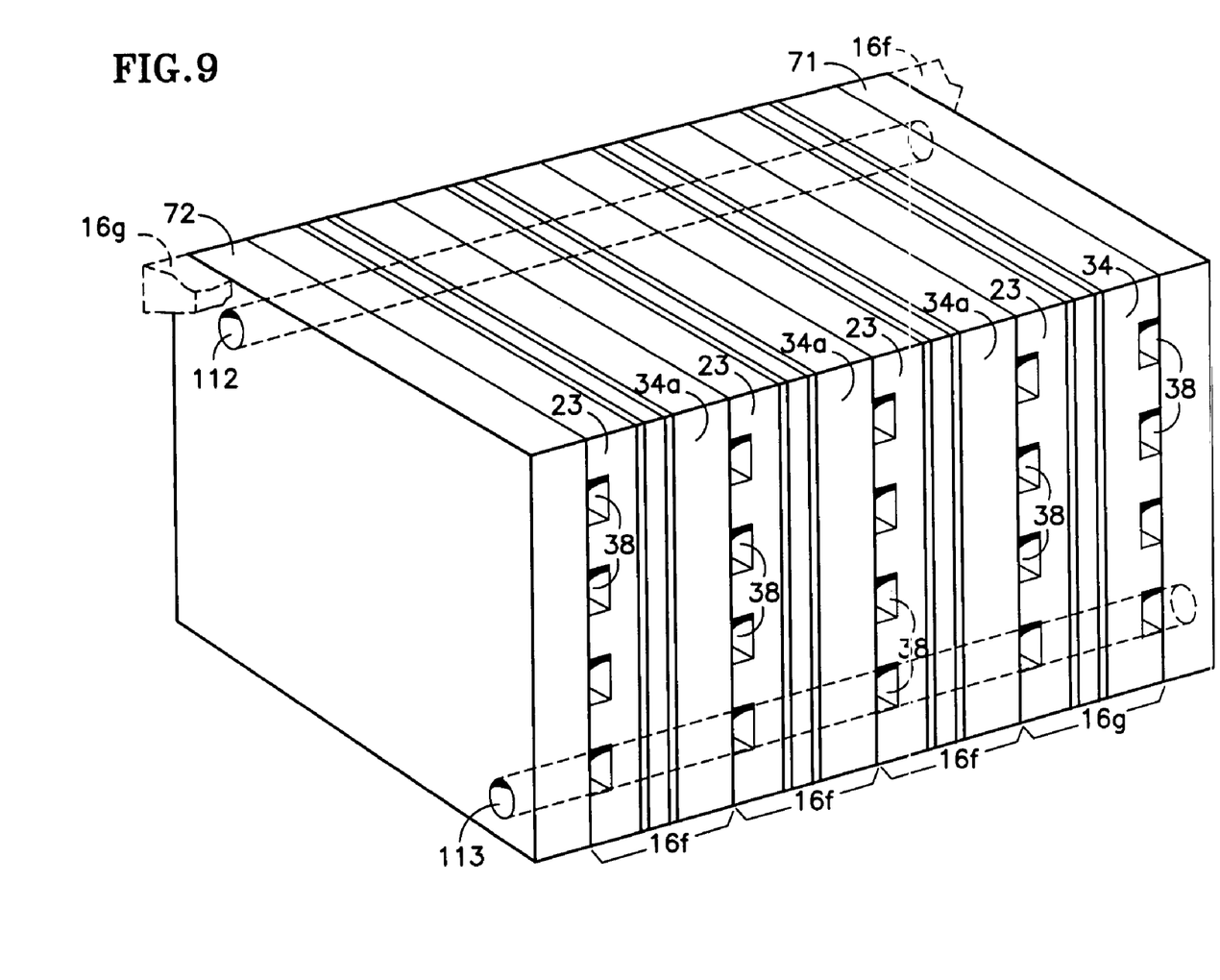
FIG. 9 is a perspective view of a plurality of cells between solid plates and having internal water manifolds passing therethrough, in accordance with the invention.

In FIG. 9, a plurality of fuel cells 16f, 16g are shown with the reactant gas flow channels thereof omitted for clarity, disposed between cooler plates 71, 72. All solid separator plates have been omitted. Internal water manifolds 112, 113 extend through the upper left corner of the plates 71 and fuel cells 16f, 16g and through the lower right corner of the plates 71 and the fuel cells 16f, 16g.

These manifolds 112, 113 are in fluid communication with the water flow channels 38, which for the cells 16f are found only in the anode water transport plates, the water transfer plates 34a on the cathode side not having water flow channels, the pores therein being completely in fluid communication with the water flow channels 38 of the contiguous anode water flow plates 23 adjacent thereto. However, in the fuel cells 16g, the water transport plates 34 on the cathode side have water flow channels 38. All of the water flow channels 38 are in liquid communication with the internal water manifolds 112, 113.

Figure 10:
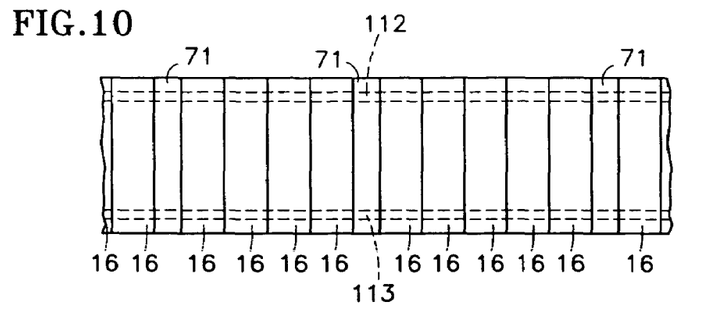
FIG. 10 is a simplified, stylized side elevation view illustrating the internal water manifolds of FIG. 9.

In the embodiment of FIG. 9, the internal water manifolds 112, 113 extend not only through four fuel cells, and the water transport plates, but extend throughout the entire fuel cell stack, as is illustrated in FIG. 10. In this way, each of the anodes which is contiguous with a cooler plate 71 will receive the necessary water from the internal water manifolds 112, 113. Similarly, excess product water from each of the fuel cells 16g, which are contiguous with the cooler plates 71 will have product water removed through its own water channels 38 (FIG. 9) into the internal water manifolds 112, 113.

Figure 11:
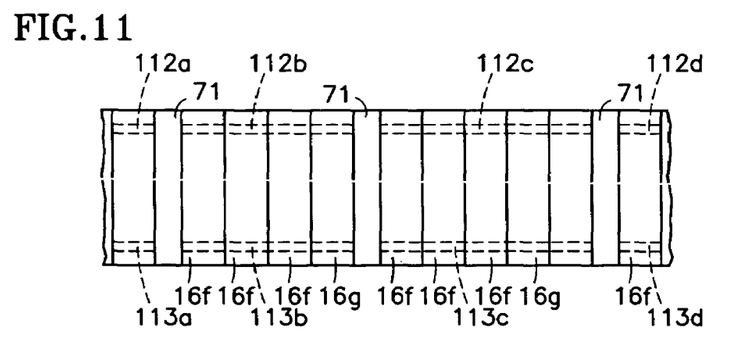
FIG. 11 is a simplified side elevation view of a group of fuel cells illustrating internal water manifolds that conduct water among fuel cells that are between solid plates, in accordance with the invention.

However, the invention also encompasses restricting the flow of water to a group of cells between cooler plates as illustrated in FIG. 11. Thus, the internal water manifolds 112b, 113b and 112c, 113c pass only through four fuel cells 16f, 16g each. The choice of whether to limit the flow to groups between cooler plates or to allow the flow to pass through the entire fuel cell stack will depend on any particular design criteria of an implemented embodiment.

Figure 12:
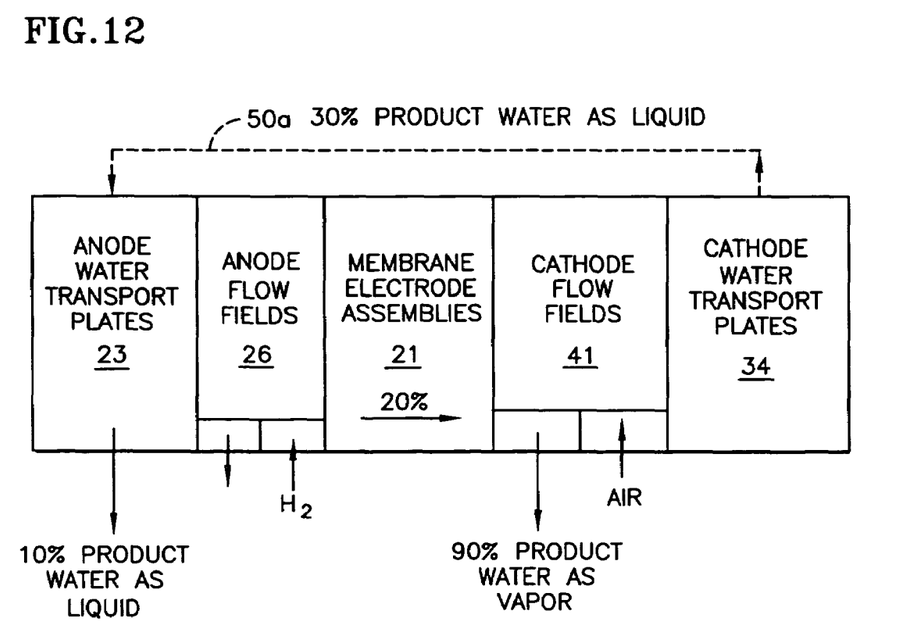
FIG. 12 is a schematic illustration of water flow in accordance with the invention.

By way of illustration only, and without regard to the exemplary percentages which are set forth, FIG. 12 illustrates the overall operational concept of the present invention. Whether the water is transferred intra-cell only (FIGS. 3-8), without comingling of water of other cells, or is transferred between contiguous cells that are adjacent to each other, and between the end cells of small cell groups which are located between solid cooler plates (FIG. 1), or whether all of the fuel cells of the stack are in liquid communication with each other (FIGS. 9 and 10). In a typical group of fuel cells, net water flux from anode to cathode is on the order of 0.2 moles of water per mole of product water, about a 20% mole fraction of water in the hydrogen stream, at 100 kPa, is required in order to avoid having the anode pump itself dry, leading to early failure. This is equivalent to a dew point of 65° C.

In FIG. 12, if one assumes that 20% of product water flows from the anode flow fields through the membrane electrode assemblies to the cathode flow fields, as illustrated, which is due to proton drag and with a properly hydrated anode, due in part to osmosis, then water balancing may be achieved by assuming that 90% of the product water will leave the cathode flow fields as vapor, which is easily achieved without excessive oxidant reactant gas pressures so long as the temperatures of the reactant streams exiting the fuel cell are controlled in a known manner. If 30% of the product water is transferred by some water transfer capability 86a (such as has been described with respect to FIGS. 4-11, hereinbefore) to the anode water transport plates, two-thirds of it will be transferred into the anode fuel reactant gas flow fields and flow to the cathode flow fields, and one-third of it will flow out of the anode water transport plates as liquid. By assuring that some liquid water exits the anode water transport plates, the humidification of the anode flow fields, and the replacement of water that transfers through the membrane electrode assembly, is assured.

The invention thus achieves, without any external water plumbing (except drains) the humidification of the anode and removal of excess water at the cathode, whether or not sections of the fuel cell are separated by solid separator plates and/or solid cooler plates. Because solid cooler plates can be used every two to six fuel cells, the cooling function can be taken over by antifreeze coolant, and not merged with water management, thereby making water management simpler and capable of being achieved internally, without any external plumbing.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell stack for a fuel cell power plant, comprising:
   a plurality of fuel cells arranged in a stack, each including a membrane electrode assembly having a proton exchange membrane between a cathode catalyst and an anode catalyst, an anode support plate adjacent said anode catalyst, a cathode support plate adjacent said cathode catalyst, a porous anode water transport plate having a fuel reactant gas flow field adjacent said anode support plate, and a porous cathode water transport plate having an oxidant reactant gas flow field adjacent to said cathode support plate;
   a plurality of solid plates, selected from one or more of solid cooler plates and solid separator plates, interposed between adjacent ones of all of said cells in said stack; and
   water transfer means disposed in said fuel cell stack for transferring water only internally within said stack from said cathode water transport plate of at least one of said fuel cells to at least one of said anode water transport plates which may be within said one fuel cell or a different fuel cell.

2. A fuel cell stack according to claim 1:
   wherein at least one of said water transport plates has a water flow field.

3. A fuel cell stack according to claim 1 wherein said water transfer means comprises at least one internal water manifold which extends completely through each of said fuel cells and each of said solid plates, end is in liquid communication with said porous water transport plates of each of said fuel cells.

4. A fuel cell stack according to claim 1 wherein said water transfer means comprises a plurality of internal water manifolds, each of which extends completely through a small group of said fuel cells in liquid communication with said porous water transport plates of the fuel cells in the corresponding group.

5. A fuel cell stack according to claim 1 wherein said water transfer means comprises a high water permeability proton exchange membrane.

6. A fuel cell stack according to claim 5 wherein said membrane has a microporous water-filled phase in excess of 10 volume %.

7. A fuel cell stack according to claim 5 wherein said membrane has a microporous water-filled phase between 15 volume % and 25 volume %.

8. A fuel cell stack according to claim 1 wherein said water transfer means comprises a water transport band in each fuel cell constructed of particles that are wettable, non-conductive and have a particle size of 5 microns or less, said band extending from said cathode water transport plate to said anode water transport plate within the corresponding fuel cell.

9. A fuel cell stack according to claim 8 wherein said water transfer bands comprise silicon carbide.

10. A fuel cell stack according to claim 9 wherein said silicon carbide is deposited onto a support plate of each said fuel cell in sufficient thickness so as to accommodate the thickness of said support plates and said catalysts.

11. A fuel cell stack according to claim 1 wherein porous water transfer zones are adjacent to at least one edge of each said fuel cell, said water transfer zones of each cell are contiguous and in water communication with at least one edge of said cathode water transport plate of said each cell and with at least one edge of said anode water transport plate of the same cell.

12. A fuel cell stack according to claim 11 wherein said water transfer zone includes a flow restriction between said cathode water transport plate and said anode water transport plate.

13. A fuel cell stack according to claim 1 wherein about 90% of product water generated at the cathodes of said fuel cells is removed from said stack as vapor in exhaust of said oxidant reactant gas flow field, about 30% of product water generated at the cathodes of said fuel cells is transferred wholly within said stack from said cathode water transport plates of said stack to the anode water transport plates of said stack, and about 10% of the product water generated at the cathodes of said fuel cells is expelled as liquid water through exhaust of said anode water transport plates.

14. A method of operating a fuel cell power plant having a stack of fuel cells, each fuel cell including a membrane electrode assembly having a proton exchange membrane between a cathode catalyst and an anode catalyst, an anode support plate adjacent said cathode catalyst, a cathode support plate adjacent said cathode catalyst, a porous anode water transport plate having fuel reactant gas flow field adjacent said anode support plate, and a cathode water transport plate having an oxidant reactant gas flow field adjacent to said cathode support plate, and a plurality of solid plates, selected from one or more of solid cooler plates and solid separator plates, interposed between adjacent ones of all of said cells, said method comprising;
   transferring water only internally within said fuel cell stack from said cathode water transport plate of at least one of said fuel cells to at least one of said anode water transport plates which may be within said one fuel cell or a different fuel cell.

15. A method according to claim 14, comprising:
expelling 80%-95% of product water generated at the cathodes of the fuel cells of said stack as vapor in the exhaust of said oxidant reactant gas flow fields;
transferring, by means of at least one water transfer path within said stack, between 25% and 40% of product water generated at the cathodes of said fuel cells from said cathode water transport plates of said fuel cells to said anode water transport plates of said fuel calls; and
removing between 5% and 15% of product water generated at the cathodes of said fuel cells to exhaust from said anode water transport plates.

16. A method according to claim 14 comprising conducting water only internally within said fuel cell stack from a cathode water transport plate at a first end of said fuel cell stack to an anode water transport plate at a second end of said fuel cell stack opposite said first end through at least one internal water manifold in liquid communication with all of said water transport plates.

* * * * *